L. R. NELSON.
LAWN SPRINKLER.
APPLICATION FILED NOV. 10, 1908.
1,007,658.
Patented Oct. 31, 1911.
2 SHEETS—SHEET 1.
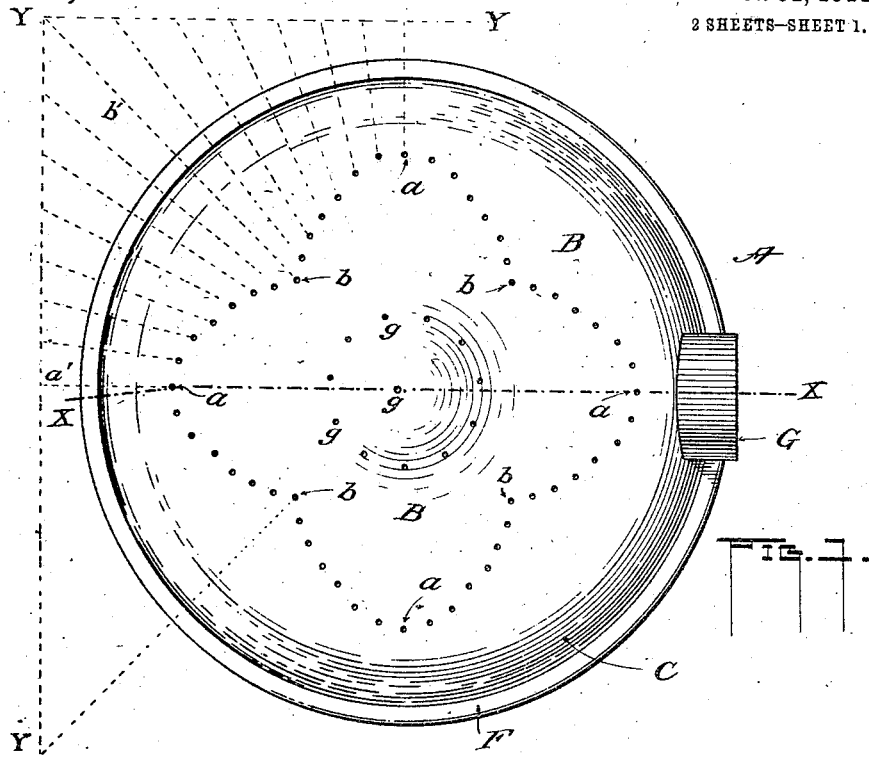
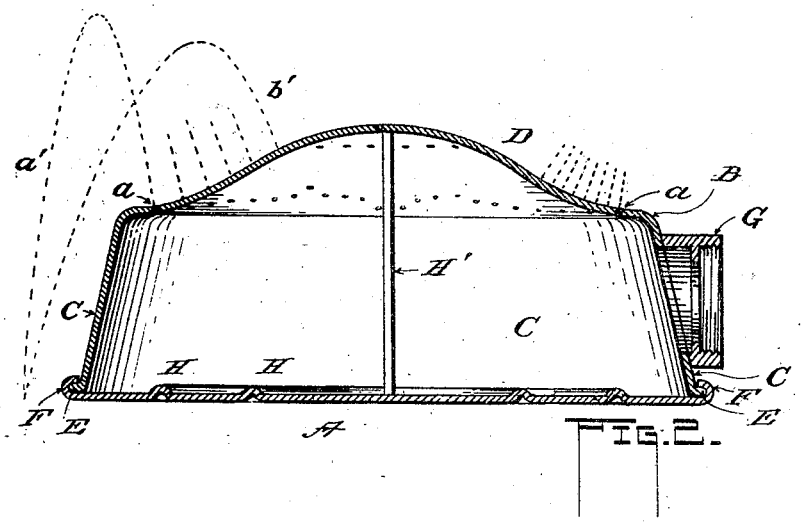
Witnesses:
Inventor
Lewen R. Nelson

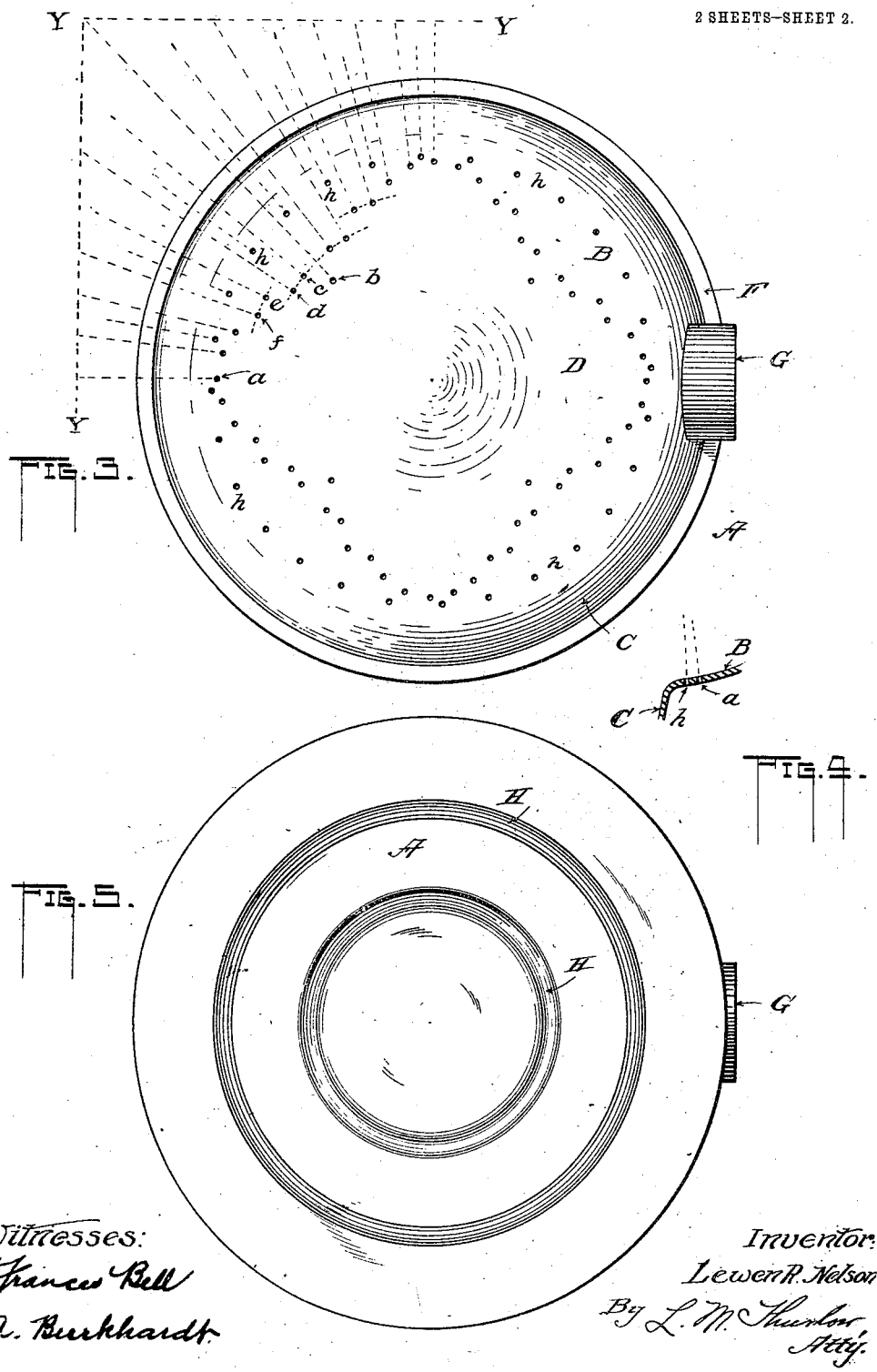

Great. As an additional strengthening medium both for external and internal pressure I erect within the body a post H' which is suitably secured to the bottom A and to the body at its apex so that the pressure of water which is often as high as 80 to 90 pounds to the inch will not rupture said body; the method of attaching the post to the dome and the bottom being such as to prevent the separation of these parts in opposite directions.

UNITED STATES PATENT OFFICE.

LEWEN R. NELSON, OF PEORIA, ILLINOIS, ASSIGNOR OF ONE-HALF TO CENTRAL BRASS & STAMPING CO., A CORPORATION OF ILLINOIS.

LAWN-SPRINKLER.

1,007,658.  Specification of Letters Patent.  Patented Oct. 31, 1911.

Application filed November 10, 1908. Serial No. 461,915.

*To all whom it may concern:*

Be it known that I, LEWEN R. NELSON, citizen of the United States, residing at Peoria, in the county of Peoria and State of Illinois, have invented certain new and useful Improvements in Lawn-Sprinklers; and I do hereby declare that the following is a full, clear, and exact description of the invention, which will enable others skilled in the art to which it appertains to make and use the same.

This invention relates to a lawn sprinkler and pertains more particularly to one that will sprinkle an area having one or more straight sides and one by the use of which the ground may be sprinkled up to the foundation of a building, for instance, or the straight edge of a sidewalk, without wetting them. It is desirable that foundation walls and side-walks be kept dry for obvious reasons, and to the end that this may be done while properly and thoroughly sprinkling the grass adjacent thereto I have constructed the device shown in the drawings attached hereto, wherein, Figure 1 is a plan of the sprinkler. Fig. 2 is a vertical section of the same on line $x$—$x$, Fig. 1. Fig. 3 is a plan of the device showing a slightly different arrangement of holes or perforations. Fig. 4 is a vertical section of a portion of the form shown in Fig. 3. Fig. 5 illustrates the under side of the sprinkler showing the manner of strengthening it.

The device consists of a preferably circular bottom A surmounted by a body B comprising the sides C and D, having a centrally convex portion and an annular externally concave portion near said sides C as clearly shown in Fig. 2. A flange E is provided at the lower edge of the body and the edge F on the bottom A is turned over upon it to make a firm water-tight joint. Secured at one side of the body is a tubular threaded portion G to which the hose is attached and the bottom A is corrugated at H in any form desired that will best strengthen it. The body as formed is very strong since by reason of its combined concave and convex surfaces of ogee form it resists pressure or blows that might tend to dent it and the form of the bottom and body are also particularly adapted to withstand internal pressure which is often very great. As an additional strengthening medium both for external and internal pressure I erect within the body a post H' which is suitably secured to the bottom A and to the body at its apex so that the pressure of water which is often as high as 80 to 90 pounds to the inch will not rupture said body; the method of attaching the post to the dome and the bottom being such as to prevent the separation of these parts in opposite directions.

The arrangement or position of the main series of holes or perforations in the sprinkler is peculiar in that said perforations are made in each quadrant of the concave portion of the body; the disposition of said perforations with reference to the surface being such that the streams or jets discharged therefrom will fall side by side to form a substantially straight line at the outer edge of the area to be sprinkled. To make this clear, I have shown in broken lines in Fig. 1 the direction of travel of two corresponding series of streams or jets and where they fall. In the lower portion of the curve where the surface becomes nearly horizontal is a hole or perforation indicated by $a$, while higher up upon the curve, and about one-eighth of the distance around the body, is a perforation $b$. The dotted lines indicated by $a'$ and $b'$ in Fig. 2 indicate the forms of streams projected from the holes and the points at which they fall, these said points being on the lines Y Y, Fig. 1. The stream $b'$ is projected to a considerable distance and meets the ground at the intersection of the two meeting sides of the sprinkled area, while the stream $a'$ falls closer to the hole from which it proceeds. The reason for the difference in the distances thrown is that the streams $a'$ and $b'$ are thrown outward at very different angles. Upon the surface intermediate the holes $a$ and $b$ is disposed a series of holes or perforations in such a position relative to the curve of said surface that the streams projected therefrom fall upon the ground in substantially a straight line between the points at which the streams or jets $a'$ and $b'$ fall, or, in other words, in passing from the hole $a$ each succeeding hole will be a little higher up on the curve and will therefor throw a stream more nearly in a horizontal direction than the one before it.

The arrangement of the holes has been varied slightly in Fig. 3. The number of holes is the same as in Fig. 1, but two pairs of them c d and e f, nearest the hole b, are arranged on two different arcs struck from the center of the body. This arrangement gives substantially the same results as before, but in addition as the holes c and e are farther from the line Y Y than d and f respectively, the streams projected therefrom will not quite reach the line, and will thus distribute water within the marginal line. It is to be borne in mind that the number of holes may be increased or decreased to provide for a difference in the amount of water discharged.

A series of holes g, Fig. 1, may be provided in the middle of the body to provide for a heavier discharge of water, if desired, within the boundaries of the sprinkled area and also to present an arrangement of the jets pleasing to the eye; and these holes being nearly vertical, the nearly vertical streams fall well within said boundary. Figs. 3 and 4 show a circular row of holes h in the nearly horizontal surface of the body outside the series of holes a, and these serve the same purpose.

It may be observed that unless the perforations be bored obliquely or otherwise in very heavy metal, the direction of the jets is likely to be materially changed by any bending of the perforated wall of the chamber by ordinary rough use. For this reason forming the perforations in a concave zone is very important, since the perforated portion is thereby protected from blows by the supported central portion and the angular bend outside the perforated area.

In practice the series of holes could be used extending for instance, from one of the positions a to a next-adjacent position b, or again extending from a to a, or still again from b to b. In the first instance I am enabled to sprinkle up to a straight line lying between the point a' and Y Fig. 1. In the second instance where the series of holes from a to a are used I can sprinkle up to one half the line Y Y and a line at right angles to it of equal length or the area covered by the broken radial lines in Fig. 1. In the third instance the series of holes from b to b would sprinkle up to the full line Y Y and a sprinkler could be made with any one of these series only in it.

What I claim is:

1. A sprinkler chamber having an inlet for water under pressure and provided with a series of outlet perforations in its upper side whose axes substantially intersect a vertical line at different inclinations, each axis lying at a different height at said line and all diverging from the outer surface of said upper side with respect to each other.

2. A sprinkler chamber having an inlet for water under pressure and provided with a series of outlet perforations in its upper side arranged about a point inward from said series, said perforations in passing from the outermost of the series progressively increasing in inclination with respect to each of two vertical planes perpendicular to each other and passing through the said outermost perforation of the series substantially as set forth.

3. A sprinkler chamber having the outer portion of its upper wall upwardly concave and provided with a series of discharge openings at different heights along the inner ascending side of the concave portion, said series of openings in passing from the middle of the series progressively increasing in inclination with respect to each of two vertical planes perpendicular to each other and passing through the middle perforation of the series substantially as set forth.

4. A sprinkler chamber of circular form provided with an inlet for water and having the outer portion of its upper wall upwardly concave and provided in each quadrant with a series of discharge perforations approximately radial with respect to the curve and at heights which increase progressively in passing from the medial perforation of the series.

5. A circular, flat bottomed sprinkling chamber having in its top an externally concave, annular marginal portion provided in each quadrant with a series of perforations at progressively increasing distances from the center of the top.

6. A circular sprinkling chamber having an inlet for water, a flat bottom, and a dome-like top centrally connected to the bottom, said top having an annular, marginal, externally concave zone provided in each quadrant with a series of perforations at progressively varying distances from the vertical axis of the chamber.

7. A sprinkler chamber provided with an inlet for water under pressure and having the outer portion of its upper wall upwardly concave and provided with a series of outlet perforations in its upper side in each quadrant near its margin, the perforations in passing from the middle of each series progressively increasing in inclination with respect to each of two vertical planes perpendicular to each other and passing through the middle perforation of the series substantially as set forth.

8. A circular sprinkling chamber of a dome-like form provided with an inlet for water and having in its upper part an annular externally concave zone provided with a series of perforations correspondingly arranged in each quadrant the perforations of each series varying in distance from the vertical axis of the chamber substantially as set forth.

9. A circular sprinkling chamber of dome-like form provided with an inlet for water and having in its upper part an annular externally concave zone provided with a series of perforations correspondingly arranged in each quadrant, the perforations of each series varying in distance from the vertical axis of the chamber said upper part being further provided with perforations at other points substantially as set forth.

10. A sprinkler having a flat corrugated bottom and a top consisting of an externally convex central portion surrounded by an externally concave portion having its outer margin connected to the bottom by approximately vertical walls, said central portion being connected to the bottom by a post, and said concave portion being provided with a series of perforations, in each quadrant, at progressively increasing distances from the axis of the chamber, substantially as set forth.

11. A lawn sprinkler consisting of a bottom of ductile metal, a perforated dome-like body also of ductile metal, both having interlocking portions rigidly and permanently connecting them, and a post of a single part erected within the sprinkler and rigidly and permanently connected substantially centrally to both said bottom and to the top of the body and rigidly connecting them, the whole forming a unit, said body having an inlet for water under pressure.

In testimony whereof I affix my signature, in presence of two witnesses.

LEWEN R. NELSON.

Witnesses:
   E. J. ABERSOL,
   H. A. SMITH.